United States Patent [19]

Nyland et al.

[11] Patent Number: 4,598,758

[45] Date of Patent: Jul. 8, 1986

[54] MOTOR CONTROLLED TIE BAR SYSTEM FOR DIE-CASTING MACHINE

[75] Inventors: Lloyd A. Nyland, Macatawa; Berend Klompmaker, Holland, both of Mich.

[73] Assignee: Ex-Cell-O Corporation, Troy, Mich.

[21] Appl. No.: 520,949

[22] Filed: Aug. 8, 1983

[51] Int. Cl.[4] .................. B22D 17/26; B22D 17/32
[52] U.S. Cl. ........................... 164/154; 164/4.1
[58] Field of Search ............... 164/154, 4.1, 113, 312

[56] References Cited

U.S. PATENT DOCUMENTS 4,256,166  3/1981  Prince ................................ 164/154
4,285,384  8/1981  Wunder ........................... 164/154 X

FOREIGN PATENT DOCUMENTS 2910931  10/1979  Fed. Rep. of Germany ...... 164/154
2496548   6/1982  France ............................. 164/154

Primary Examiner—Nicholas P. Godici
Assistant Examiner—J. Reed Batten, Jr.
Attorney, Agent, or Firm—John C. Evans

[57] ABSTRACT

An apparatus for setting tonnage on selective tie bars of a die-casting machine includes providing a separate drive motor fully connected at all times to each tie bar nut gear. The motors are manually or automatically controlled by a programmable logic control and a die height adjustment motor control and phase lock synchronizer which selectively energize each motor manually or automatically to adjust the tonnage in any one or all of the tie bars and wherein synchronizer concurrently adjusts the tonnage a like amount in all of the tie bars concurrently and a method for adjusting the tie bar system to compensate for uneven die expansion at one of the tie-rods includes the steps of (1) tightening only the tie-rod at the die flash location; (2) operating the machine through a lock-up mode; and (3) concurrently, and synchronously, removing a like amount of pressure from the machine if lock-up is not attained, the back-off being selected to reduce the tie bar tonnage a like amount at all tie bar locations so as to produce toggle lock-up without excessive reduction of tie bar tightening at the previously compensated die location.

4 Claims, 10 Drawing Figures

MOTOR CONTROLLED TIE BAR SYSTEM FOR DIE-CASTING MACHINE

BACKGROUND OF THE INVENTION

This invention relates to die casting and clamp type machines and more particularly to the method and apparatus for adjusting tie bar tension or tonnage of the machine.

By use of the machine functions and individual tie bar drive motors each tie bar can be selectively or synchronously tightened either manually or automatically to compensate for uneven die expansion. The tie bar adjustment system is configured so that a tie bar can be removed from the system to enable a mold or die to be removed or inserted into the die casting machine.

In the die casting industry, the tie bar nuts hold the tie bars and the machine platens in rigid alignment when the die is closed and molten metal is shot into the die cavity. These bars are normally a simple threaded device with machined surfaces on the nut which abut the die casting machine platens. The machine's tie bars are under high tension (load tonnage) when closed during the shooting of metal into the die cavity to prevent flashing of the die. At this time these tie bars and nuts sustain the full impact of the shot in conjunction with the pre-load stress that is put on the bars of the machine when the machine is closed and locked up. Such bars must be adjustably tensioned to compensate for uneven die expansion at any one of the tie bar locations which are typically disposed with one bar in each quadrant of a die set-up. The clamp tonnage on a given machine tie rod determines the amount of compensation. The compensation must be maintained within limits to permit subsequent lock-up of the die halves. The system for tie bar compensation should enable the removal of these tie bars and nuts without a great deal of difficulty.

When a die is to be inserted or removed from a die casting machine or, for that matter, any type of clamp-operated machinery utilizing tie bars, it is sometimes necessary because of the size of the die itself to remove one or more of the tie bars so that the die can be removed from the machine.

In our invention, a separate drive motor is directly, continuously geared to the outside periphery of the tie bar nut. Each drive motor can be driven separately to cause the tie bar nut to be rotated to individually adjust tension in a selected tie bar. Means are provided to synchronously drive all tie bars to assure compensation of uneven die compensation while maintaining machine lock-up capabilities.

PRIOR ART STATEMENT

Various proposals for adjusting tie bar tension limits have been proposed. U.S. Pat. No. 3,642,405 shows a system whereby the adjustment of all the tie bars is produced by a single drive motor and continuous chain drive or by individual drive motors but in both cases tie bar tension is produced by adjusting all tie bars simultaneously. A similar gearing and drive mechanism is shown in U.S. Pat. No. 4,256,166 which shows gearing and drive means associated with idler gears for selectively connecting each tie bar nut to a single bull gear mechanism.

SUMMARY OF THE INVENTION

According to the objects of our invention, a plural threaded tie bar system has each tie bar provided with a nut having a gear member keyed to its periphery driven through a single drive motor for each tie bar whereby the threaded nut can be rotated separately on each tie bar. A control circuit includes synchronizing control means and individual motor energization circuits for the tie bar drive motors selected in either an automatic or manual control mode to cause each tie bar nut or all the tie bar nuts to adjust the tie bar tension to compensate for uneven die expansion without interfering with machine functions including lock-up.

A further object of this invention is to have a single motor drive screw means permanently coupled with each tie bar and nut of a tie bar die-casting machine whereby the tie bar, nut, and drive motor can be automatically or manually driven either alone or in unison without coupling and decoupling mechanical parts so that tension is controlled on the tie bar and tie bar nut to compensate for uneven die expansion without interrupting normal operating use of the machine.

A further object of this invention is to continually couple a motor tie bar nut driven system to the platen so that it will maintain its machine position when it is being rotated to adjust one tie bar or a plurality of tie bars. Yet another object of this invention is to have a plurality of individual drive motor mechanisms associated with a die casting machine which mechanisms are always coupled to the tie bars by means that enable a die to be removed from the machine either from the operator side of the machine or the helper side of the machine. It is a further object of this invention that these mechanisms be associated with all tie bars in the machine.

It is another object of this invention to provide an improved method for operating switching means for automatically or manually rotating each tie bar nut for operating the invention to compensate for uneven die expansion by the steps of (1) tightening a first tie bar at a die flash location and (2) thereafter concurrently and synchronously operating all the nuts to relieve die tonnage to maintain machine operation including lock-up while retaining sufficient greater tension in the one tie bar to compensate for die expansion.

Other objects and advantages of the invention will be hereafter described or become apparent to those skilled in the art and the novel features of the invention will be defined in the appended claims.

DESCRIPTION

Figure 1A:
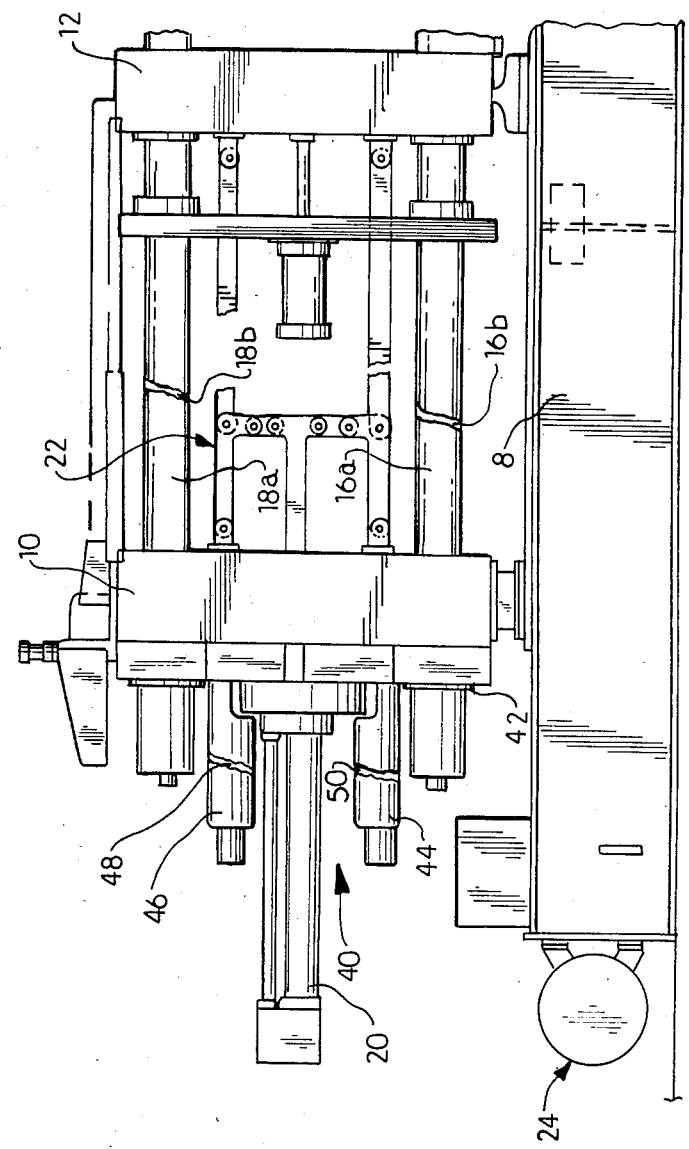
FIG. 1(A) is a side view of a typical die casting machine including the present invention.
Figure 1B:
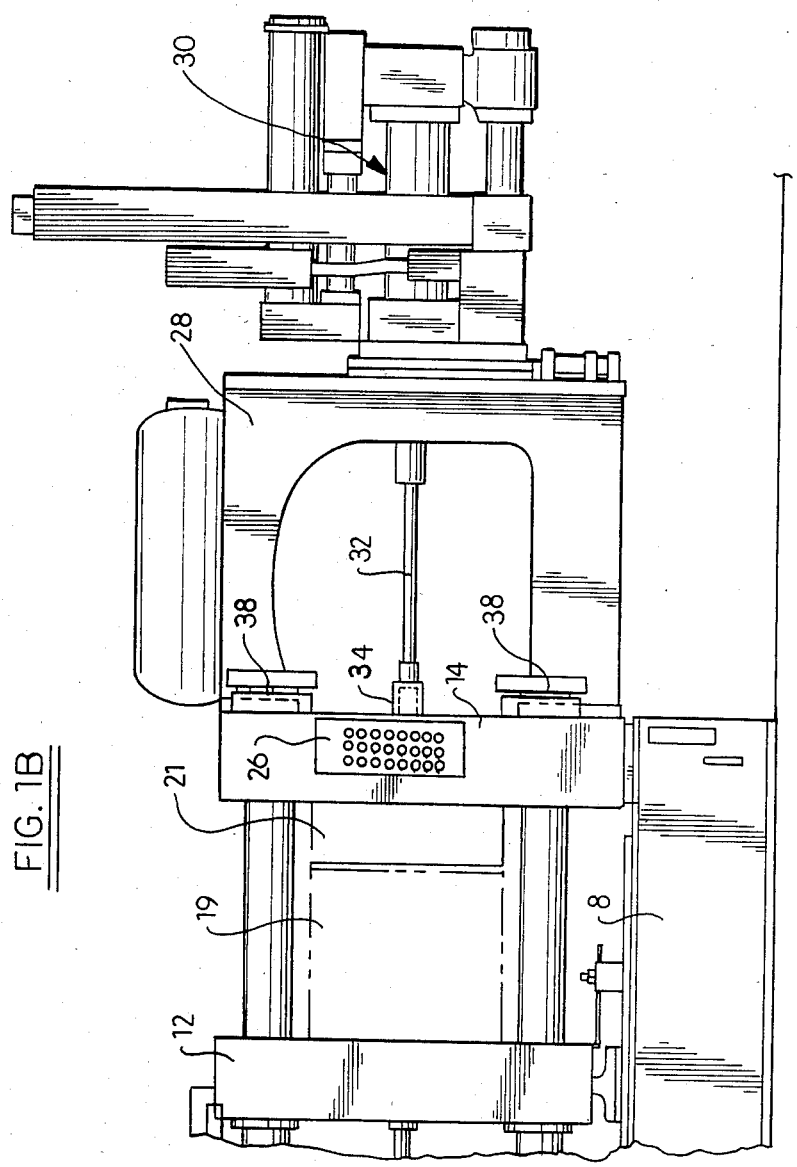
FIG. 1(B) is a continuation of the side view of FIG. 1(A)

Referring now to FIG. 1(A) and 1(B) a die casting machine is illustrated having a bed 8 which supports a rear platen 10, a moveable plate 12 and a front platen 14. Associated with the platens are a pair of lower tie bars 16 and a pair of upper tie bars 18 which extend from the front platen 14 through the moveable plate 12 and through the rear platen 10. Die half 19 is shown mounted to moveable plate 12 and die half 21 is mounted to front platen 14. Die closing cylinder assembly 20 is mounted on the rear platen 10 and operates the toggle linkage assembly 22 for moving plate 12 to open and close the die (die halves 19 and 21) shown in phantom. The force of a die-close hydraulic cylinder 20 is multiplied by the toggles which have an increased mechanical advantage to stretch the tie bars at locking after the die closes. The amount of tie bar elongation is related directly to the clamping force of the die halves 19 and 21 when the machine is in a die lock-up position. The power to operate the toggle linkage assembly 22 through hydraulic cylinder 20 is supplied by hydraulic power supply 24. The details of this hydraulic power supply, as well as the cylinder and toggle linkages, are well known in the art and will not be discussed in detail. Machine control 26 controls the various functions and movements of the machine. Attached also to front platen 14 is "C" frame assembly 28 which supports the shot cylinder assembly 30 and ram assembly 32. Cold chamber 34 attached to platen 14 has an opening into which the die casting material is poured for injection into the die assembly. The shot cylinder assembly 30 is powered by hydraulic fluid which is supplied by hydraulic power supply 24 which is shown in FIG. 1(A). Tie bar nut assemblies 38 are shown attached to tie bars 16 and to tie bars 18 at platen 14. Each nut assembly 38 is associated with an improved electric motor drive system 40 of the present invention.

Figure 2:
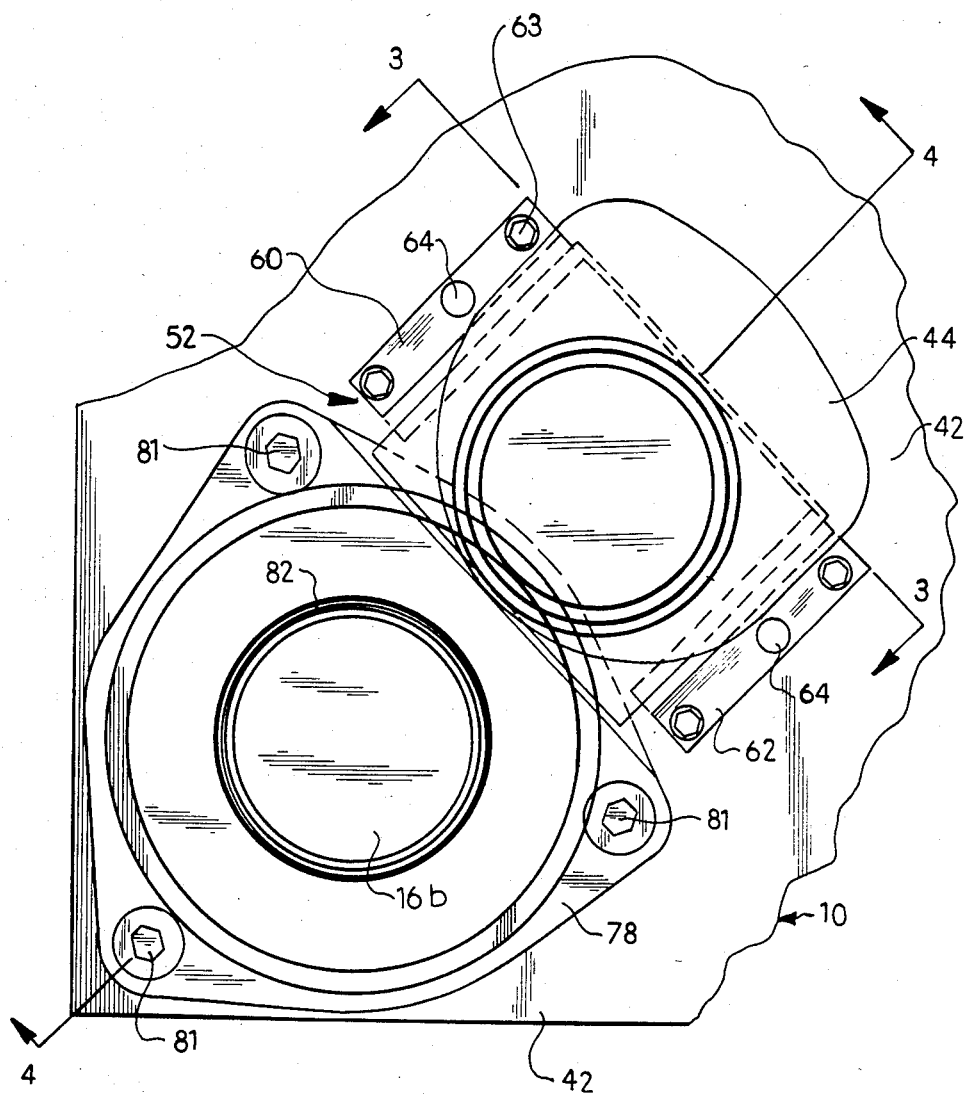
FIG. 2 is a fragmentary end view of the rear platen showing a tie bar drive unit of the invention.
Figure 3:
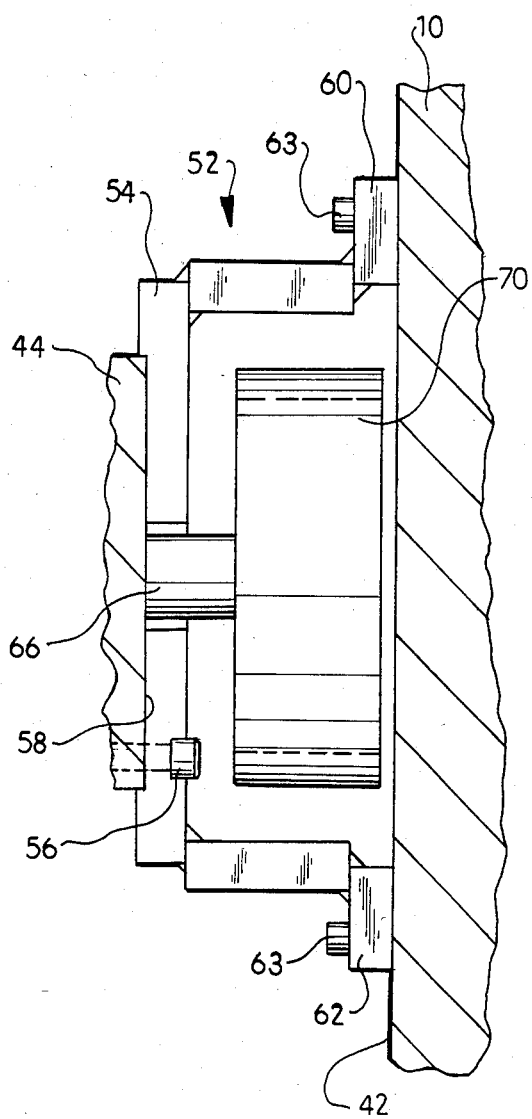
FIG. 3 is an enlarged partially sectioned view along line 3—3 in FIG. 2 showing a drive motor and associated gear means used to control tie bar tension.
Figure 4:
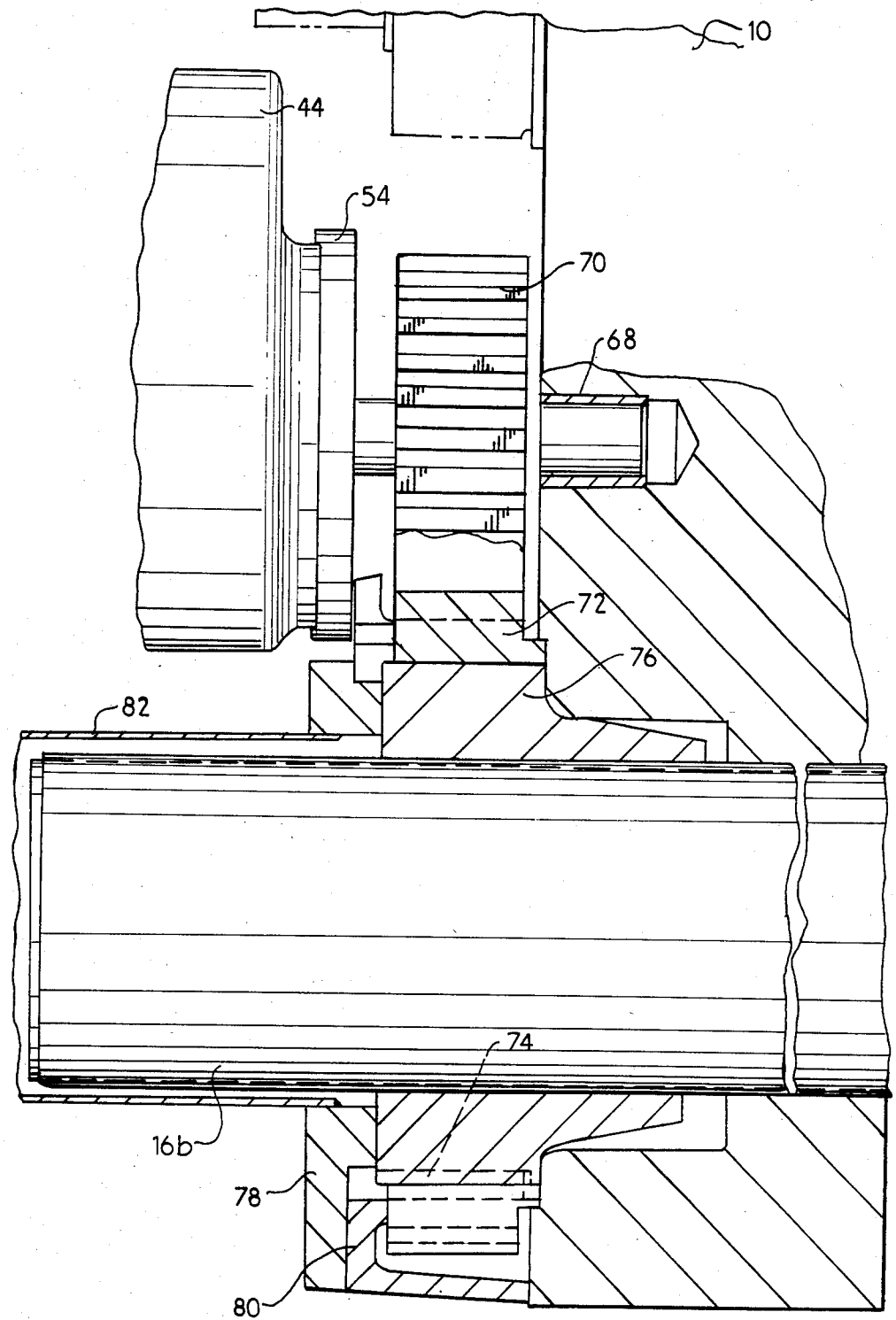
FIG. 4 is a sectional view taken along line 4—4 of FIG. 2.

FIGS. 1A and 2 show the relationship of motor drive system 40 to the tie bar locations at each corner of the unit. FIG. 4 shows the relationship of one motor of the drive system and the tie bar nut assemblies.

As shown in FIG. 2 the drive system 40 is mounted on side 42 of rear platen 10 and includes four electrical gear drive motors 44, 46, 48, 50. Each motor is connected to the rear platen 10 by a bracket 52 that has a plate 54 secured by screws 56 to end 58 of each motor and opposite ends 60, 62 secured by screws 63 to the platen 10. Pull dowels 64 accurately align each bracket 52 and each motor to platen 10. Each motor drive shaft 66 is aligned by bracket 52 with respect to a shaft support bushing 68 in the platen 10. As best seen in FIG. 4, this arrangement provides an accurately, continually fixed, reference for a drive motor gear 70 keyed to each shaft 66. Each gear 70 is meshed with a drive nut gear 72 connected by key 74 to a tie bar nut 76. The nut 76 is retained axially with respect to rear platen 10 by a gear nut retainer plate 78 which, as shown in FIG. 4, holds the nut 76 between the nut retainer plate 78 and the face of rear platen 10. Each nut gear 72 is retained axially with respect to rear platen 10 by a gear retainer 80. Both plate 78 and retainer 80 have three ears with aligned holes through which screws 81 are directed to threadably engage platen 10 to hold the parts together. Each nut 76 threadably engages threads on the end of each tie bar 16, 18 which has its end covered by an open ended nut retainer shield 82 welded at one end to the nut retainer 78.

The individual motors 44, 46, 48, 50 are either manually or automatically controlled individually or together synchronously to achieve a highly adaptable compensation of tie bar tension so that the tie bar tension, hydraulic pressure in cylinder and cycle element time can be combined to achieve efficient machine die closure conditions.

The automatic individual tie bar adjustment feature is designed to compensate for uneven die expansion caused by non-uniform heat buildup in the tool. It accomplishes this by continually monitoring the load or stretch on each tie bar at lock-up and then automatically adjusts each tie bar nut prior to the next cycle to maintain the loading on each bar within preset limits.

Automatic operation will sense uneven tie bar loading and begin corrective action by adjusting the proper tie bar nut to increase or decrease the tie bar load before beginning the next cycle. This action will continue, following each cycle, until the loading on each tie bar is back within tolerance or operational limits are exceeded. In the event the limits are exceeded the next cycle will be aborted and a machine fault will be indicated by suitable indicator means.

Figure 5:
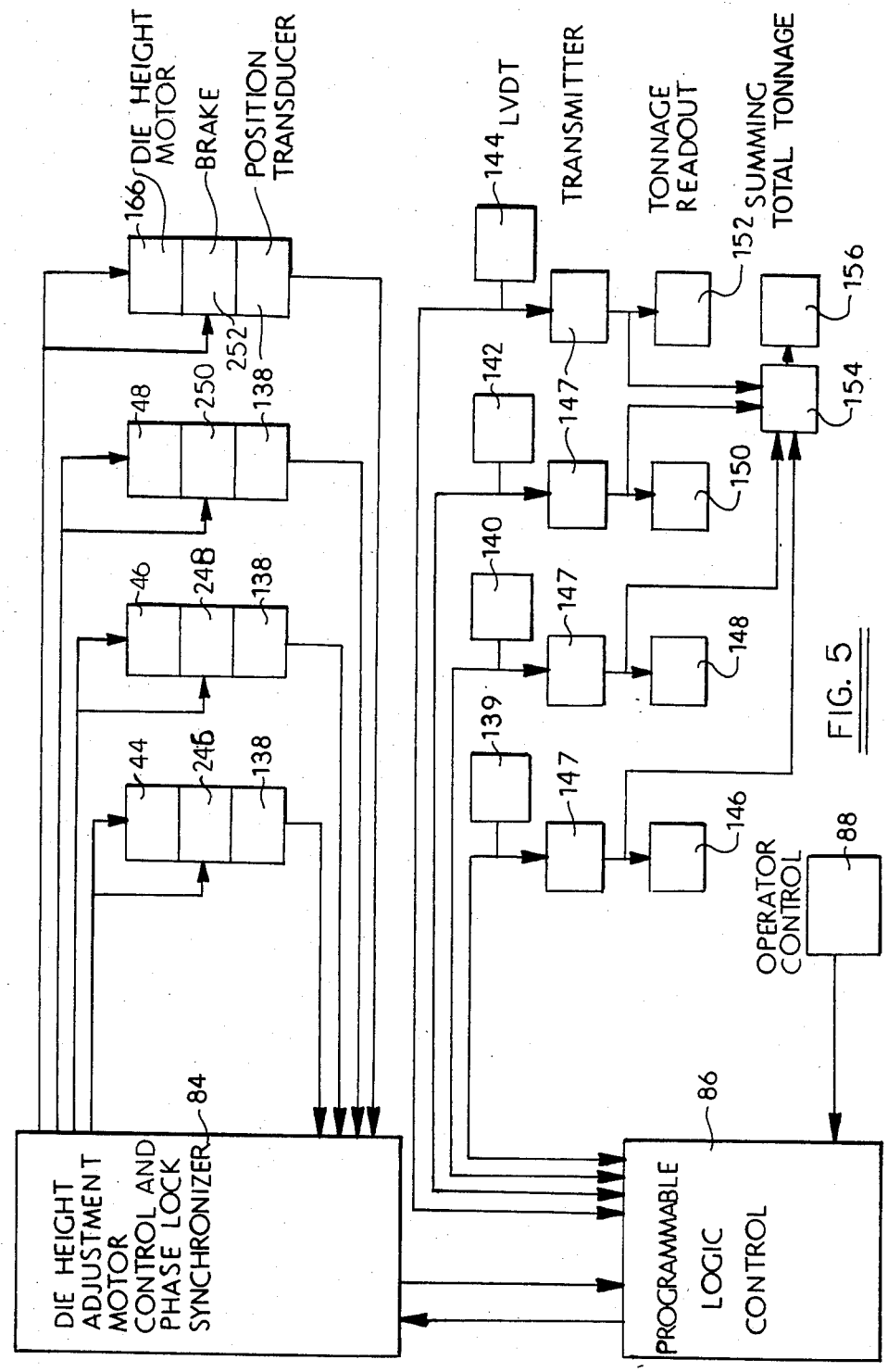
FIG. 5 is a schematic wiring diagram of a control for the method of the invention.

A control circuit schematic is shown in FIG. 5. It includes a phase lock synchronizer 84, a programmable logic control 86 and an operator control 88. In particular, motors 44, 46, 48, 50 can be operated in a manual mode or automatic mode set by operator control 88.

Figure 6:
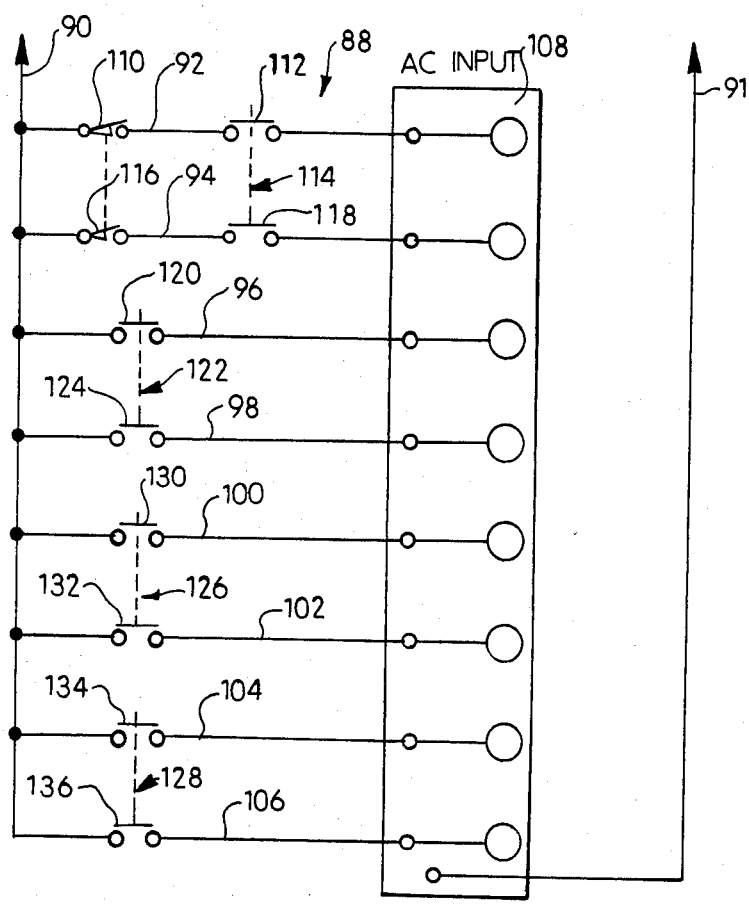
FIG. 6 is a wiring diagram of the operator control mode selector switches.

The selector switches for operator control 88 are shown in FIG. 6. A/C power busses 90,91 are connected to control 88 which includes a tie bar forward circuit 92; a tie bar reverse circuit 94; a manual one bar height control circuit 96; an automatic all bar height control circuit 98; a tie bar 16a circuit 100; a tie bar 16b circuit 102; a tie bar 18a circuit 104 and a tie bar 18b circuit 106. Each of the circuits is connected to an input terminal block 108 of the logic control 86 to input the control 86 for different modes of operation.

Circuit 92 is controlled by a die height forward limit switch 110 and one pole 112 of a three-position spring centered selector switch 114. Switch 114 has a first centered off position and a second position in which pole 112 is closed across contacts in circuit 92 when forward drive is selected.

Circuit 94 is controlled by a die height reverse limit switch 116 and another pole 118 of switch 114 which is closed when switch 114 is in its third position when reverse drive is selected.

The spring centered three-position selector switch 114 enables the die height to be increased or decreased as required. The switch 114 is not operable in automatic machine operation.

The manual one-bar circuit 96 is controlled by one pole 120 of a three-position spring centered selector switch 122. Pole 120 is closed when selector switch 122 is in a "one bar" position. It inputs logic control 86 to produce an output from control 86 to permit adjustment of one bar at a time as selected by individual tie bar circuits 100, 102, 104 and 106 and when either the die forward circuit 92 is closed or the die reverse circuit 94 is closed.

The automatic all bars circuit 98 is controlled by another pole 124 of selector switch 122. When pole 124 is closed on its contacts in a third position of switch 122, the logic control 86 produces output signals that enable adjustment of all bars simultaneously when the tie bar circuits 100–106 are closed by three position selector switches 126, 128. Any previously set die square or out-of-square position will be maintained by such simultaneous movement of all tie bars. When pole 124 is closed in its automatic position the logic control 86 is programmed to automatically adjust the die height after each machine cycle to maintain equalized loading of each tie bar within preselected limits.

The three-position selector switch 126 is a spring centered two-pole switch which has a first position where its poles 130, 132 are open; a second position where only pole 130 is closed to select tie bar 16a circuit 100 for operation and a third position where only pole 132 is closed to select tie bar 18a circuit 102 for operation.

The three-position selector switch 128 is a spring-centered two-pole switch which has a first position where its poles 134, 136 are open; a second position where only pole 134 is closed to select tie bar 18b circuit 104 for operation and a third position where only pole 136 is closed to select tie bar 16b circuit 106 for operation.

Each electric motor drive unit 44, 46, 48, 50 has a position transducer 138 to sense its speed of rotation; each transducer 138 is coupled to each tie bar nut. A special phase lock synchronizer 84 maintains the same position of each motor relative to the other when all four are operated simultaneously. The system will shut down when and if preselected limits of operation are exceeded. If desired, operation of one unit at a time can be accomplished, as described above.

As described above, the motor drive system 40 is connected directly and continuously to the tie bars 16, 18. Accordingly, adjustment of one tie bar can take place without disengagement of any mechanism in the mechanical drive paths. In the present invention, tie bar tension is adjusted only when the die halves 19, 21 are open.

During pre-set automatic adjustment of individual bars logic control 86 determines the difference between a predetermined desired single tie bar tension and a measurement of actual tension or tie bar tonnage which is measured by a suitable mechanical movement sensing transducer such as a linear voltage displacement transducer (LVDT) 139, 140, 142, 144 connected to each tie bar 16, 18 to produce a continually variable voltage signal proportional to the actual tie bar tension as produced by changes in tie bar length resulting from stretch in the tie bars produced by load changes on each tie bar. The actual load signal is transmitted via a tonnage display by means of transmitters 147. The actual signal is compared to the desired setting by the logic control 86 to compare the measured value with a previously programmed desired value reflecting an optimum die position at each tie bar location which will prevent die flashing while maintaining a proper balance in the hydraulic pressure of cylinder 20 and the tie bar tension at lock-up.

The present invention also enables several other modes of tie bar tension adjustment to be obtained. Actual measured individual tie bar tension can be observed by an operator. If only one tie bar tension is out of adjustment, for example upper tie bar 18a, its tonnage will be shown on a digital tie bar tonnage display 146. Individual displays 146, 148, 150, 152 are provided for LVDT's 139, 140, 142, 144, respectively. The output of each LVDT is summed by a summing module 154 and also read out by a digital display 156 of total tonnage.

To manually adjust tension in one tie bar such as lower tie bar 16b one motor is driven to (1) move a nut 72 clockwise (to increase tonnage) as viewed in FIG. 2. This causes the tie bar 16b to be placed under greater tension when the machine is moved to close die halves 19, 21. Consequently greater force is placed on the dies to reduce actual flash or tendency for die flash. However, at the same time, such adjustment of one tie bar can cause other corners of the die to be misaligned. Thus, in accordance with the present invention, selector switches 122, 126, 128 are positioned to simultaneously adjust all the tie bars together an equal amount to adjust the system to maintain all the tie bar tensions within a given upper and lower limit while retaining most of the desired correction of tonnage at the die flash tie-rod location.

If desired, the machine can automatically adjust individual tie-rods whenever they are out of the desired high and low limits of tie bar tension. Continuous signals from transducers 139, 140, 142, 144 are compared against desired high and low limit values to produce a continuous on-off drive of the individual motors to hold the tie bars within the desired range.

During continuous energization of all motors 44, 46, 48, 50, phase lock synchronizer circuit 84 controls a motor controller 166 for each motor which, in one working embodiment, is a Morse CG-1000, AC Adjustable Motor Control WA 6385. The circuit 84 has a master phase lock loop 118; Morse PL-1001, with a position transducer 138 of the tachometer type coupled through the motor drive shaft to each tie bar nut which in cooperation with slave phase lock loop 168, Morse PL2051, produces a controlled energization of each drive motor to produce synchronous drive of all tie bars when all motors are driven at the same time (either manually or in accordance with a desired automatically controlled logic circuit sequence). The motors 44, 46, 48, 50 are Sterling Gear Motors B182-323CZ having a ½ HP rating operating at 9 RPM.

Figure 7:
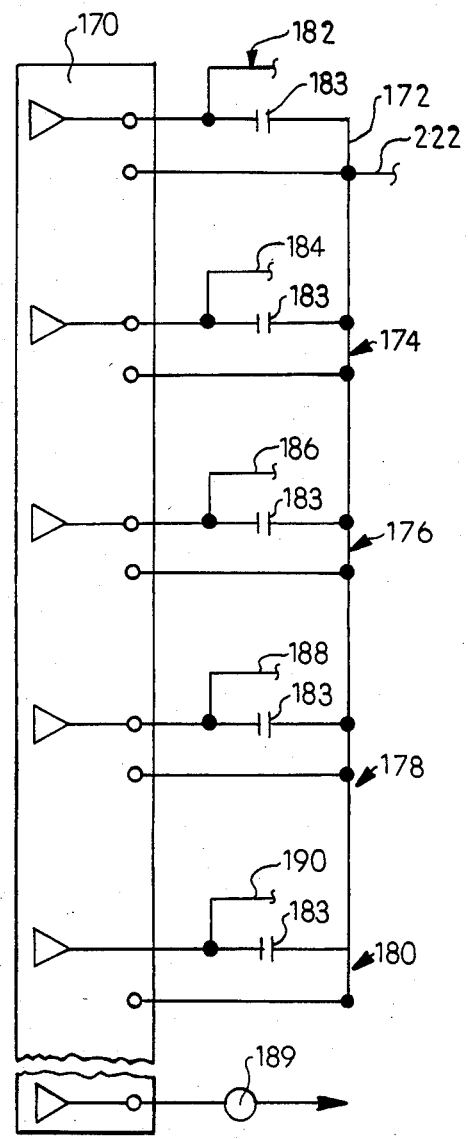
FIG. 7 is a contact output of a logic control of the present invention.
Figure 8:
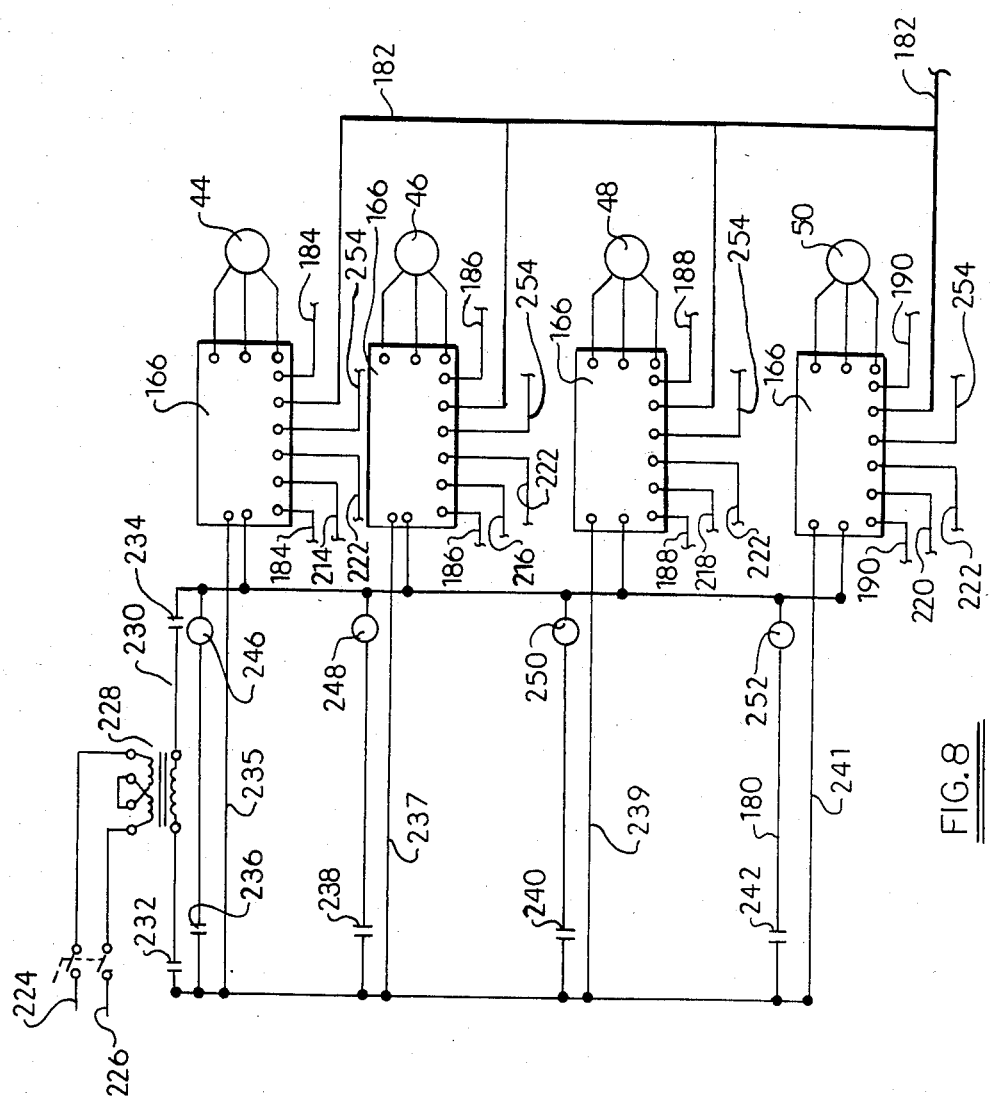
FIG. 8 is a wiring diagram of the motor control circuit in the control means of FIG. 4.

A contact output 170 from the logic control 84, shown in FIG. 7, connects to a direction select circuit 172 and tie bar start circuits 174, 176, 178, 180. The contact output 170 selectively operates relay switch 183 in the direction select circuit 182 to control power to conductors 172 and 222. In each of the tie bar start circuits power input to conductors 184, 186, 188, 190 is controlled by relays 183. Conductors 184, 186, 188, 190 are connected to motor controllers 166 and to the phase lock loops at associated relay switches 192, 194 which are operated by a coil 189 which is selectively energized by contact 120 of switch 122 to as to control potentiometer 191 to a lower speed setting for one bar control.

Figure 9:
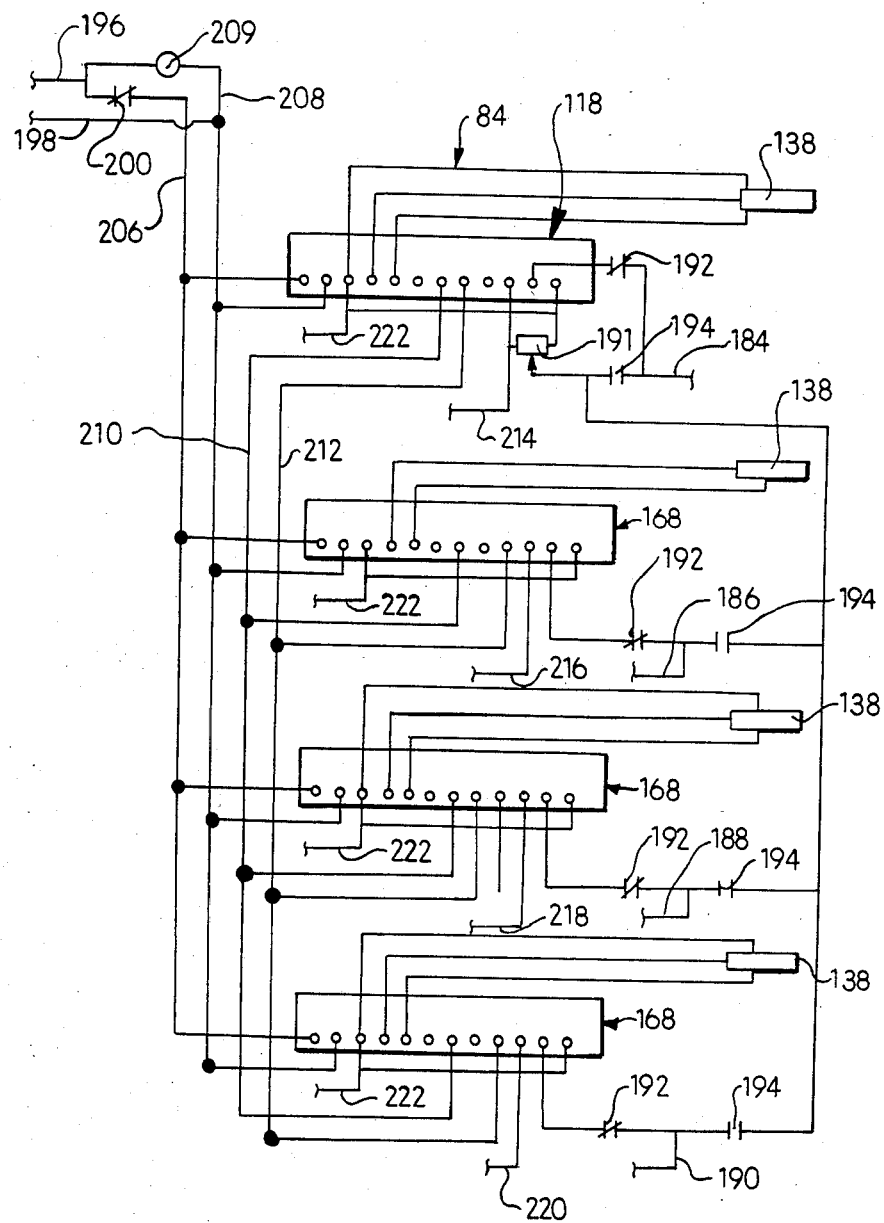
FIG. 9 is a wiring diagram of the synchronizer control in the control means of FIG. 5.

Power supply for the phase loop synchronizer circuit 84 best shown in FIG. 9, has 120 volt power supply leads 196, 198. Relay control switch 200 controls power to phase loop power lines 206, 208. Coil 209 is controlled by a panel door switch and operates relays 232, 234 in the power supply for the motor control circuit. Each phase lock loop is interconnected by conductors 210, 212 and each phase lock loop is connected to each motor controller 166 by conductors 214, 216, 218, 220. A common lead 222 is provided to all phase lock loops and motor controllers as shown.

The power supply to the motor controllers 166 includes lines 224, 226 of an A/C power source connected to a transformer 228 that supplies a relay switch controlled network 230 having relay switches 232, 234 and power lines 235, 237, 239, 24 to the controllers 166 and individual brake relays 236, 238, 240, 242 for selectively or simultaneously braking each motor when it is not energized by means of brakes 246, 248, 250, 252. A trip line 254 to each controller is connected to D.C. input terminals of the logic control 86 to input out-of-range operation of a given tie bar to produce an output at contact output 170 to shut-down drives when an out-of-range condition occurs.

While the specific details of a preferred embodiment are illustrated, changes and alterations may be made without departing from the spirit and scope of the invention.

What is claimed is:

1. In a clamp type machine with spaced apart front and rear platens and a movable platen therebetween for positioning die tools and including associated tie bars each having a threaded tie bar nut connected thereon for adjusting tie bar tension the improvement comprising; a plurality of electric drive motors each having an output shaft, a drive motor gear fixed to each output shaft and continuously meshed with one of the tie bar nuts, motor control circuit means for independently or simultaneously energizing each of said drive motors, means for synchronizing the drive of each of said drive motors when simultaneously energized, a programmable logic control means having input means and output means, selector switch means to input the input means of said logic control means to a manual mode and an automatic mode, and switch means associated with said motor control circuit means responsive to the output means of said logic control means when in an automatic mode to simultaneously energize one or more of said electric drive motors to produce adjustment of individual ones of the tie bars or all of the tie bars to compensate for uneven die tool expansion caused by uneven heat built-up in the die tool.

2. In the combination of claim 1, a position transducer operatively coupled to each tie bar and providing a position signal responsive to tie bar adjustment, and means including phase lock control means responsive to said position signal to maintain the output position of each drive motor relative to the output position of the other drive motors when all motors are operated simultaneously.

3. In the combination of claim 1, means for sensing tie bar loading and directing a load signal to said logic control input means, said logic control means operative to compare said load signal to predetermined load limits and operative to produce a tie bar correction signal to said motor control circuit means to position the motor output shaft to adjust the tie bar unit position to increase or decrease tie bar load before beginning a subsequent machine cycle.

4. In the combination of claim 3, a position transducer operatively coupled to each tie bar and providing a position signal responsive to tie bar adjustment, and means including phase lock control means responsive to said position signal to maintain the output position of each drive motor relative to the output position of the other drive motors when all motors are operated simultaneously.

* * * * *